(12) United States Patent
Pijlman et al.

(10) Patent No.: US 8,128,273 B2
(45) Date of Patent: Mar. 6, 2012

(54) ILLUMINATION SYSTEM AND DISPLAY DEVICE

(75) Inventors: Fetze Pijlman, Eindhoven (NL); Giovanni Cennini, Eindhoven (NL); Michel Cornelis Josephus Marie Vissenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 340 days.

(21) Appl. No.: 12/446,275

(22) PCT Filed: Oct. 23, 2007

(86) PCT No.: PCT/IB2007/054297
§ 371 (c)(1),
(2), (4) Date: Apr. 20, 2009

(87) PCT Pub. No.: WO2008/050288
PCT Pub. Date: May 2, 2008

(65) Prior Publication Data
US 2010/0315832 A1    Dec. 16, 2010

(30) Foreign Application Priority Data

Oct. 26, 2006  (EP) .................................... 06122982
Mar. 7, 2007   (EP) .................................... 07103686

(51) Int. Cl.
*F21V 7/04* (2006.01)

(52) U.S. Cl. ......... 362/607; 362/612; 362/621; 362/625

(58) Field of Classification Search .................. 362/237, 362/241, 243, 245, 293, 327, 331, 332, 606, 362/607, 612, 621, 622, 625, 626, 627
See application file for complete search history.

(56) References Cited

U.S. PATENT DOCUMENTS

| | | | |
|---|---|---|---|
| 5,587,816 A | 12/1996 | Gunjima et al. | |
| 6,222,598 B1 | 4/2001 | Hiyama et al. | |
| 6,682,207 B2 * | 1/2004 | Weber et al. | 362/293 |
| 7,052,152 B2 | 5/2006 | Harbers et al. | |
| 7,322,731 B2 * | 1/2008 | Epstein et al. | 362/607 |
| 2002/0141194 A1 | 10/2002 | Wortman et al. | |
| 2004/0233665 A1 * | 11/2004 | West et al. | 362/245 |
| 2005/0001537 A1 | 1/2005 | West et al. | |
| 2007/0081329 A1 * | 4/2007 | Chua et al. | 362/607 |
| 2007/0165417 A1 * | 7/2007 | Wu et al. | 362/612 |

* cited by examiner

*Primary Examiner* — Y My Quach Lee

(57) ABSTRACT

An illumination system for illuminating a display device includes a light-mixing chamber having a light-exit window, a rear wall situated opposite the light-exit window, and edge walls which extend between the light-exit window and the rear wall. A surface of the rear wall is substantially specularly reflective for specularly reflecting light impinging on the surface of the rear wall and having a relatively large angle of incidence with respect to an axis perpendicular to the rear wall. The illumination system further includes a light source light out-coupling elements. The light source emits light into the light-mixing chamber in a direction substantially parallel to the light-exit window. The illumination system further includes an angularly reflective filter applied at the light-exit window. The angularly reflective filter includes substantially transparent layers, each layer having a substantially uniform thickness. Each set of two adjacent layers of the angularly reflective filter has different refractive indexes.

17 Claims, 5 Drawing Sheets

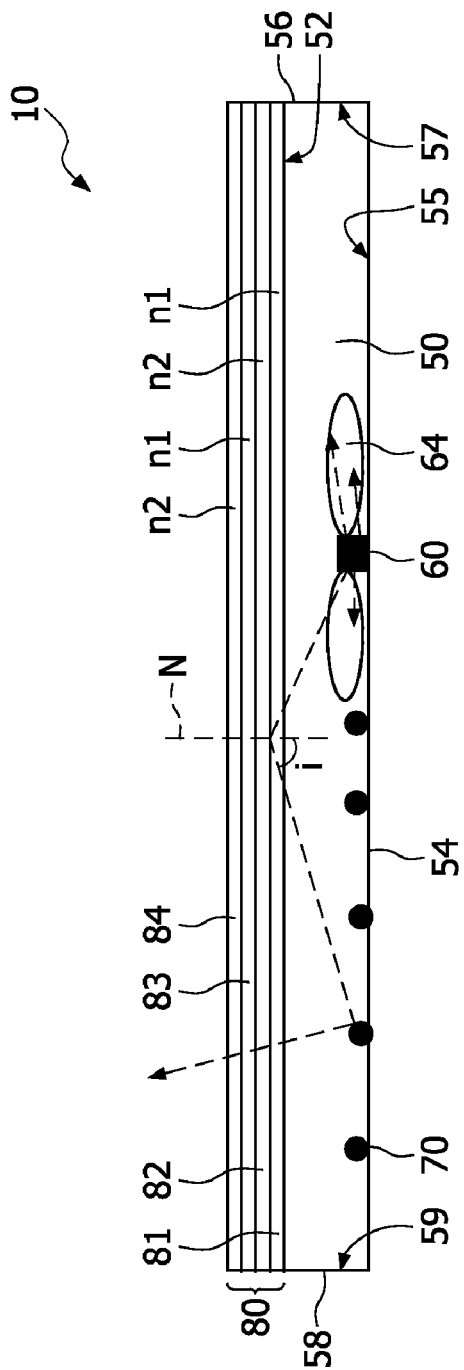

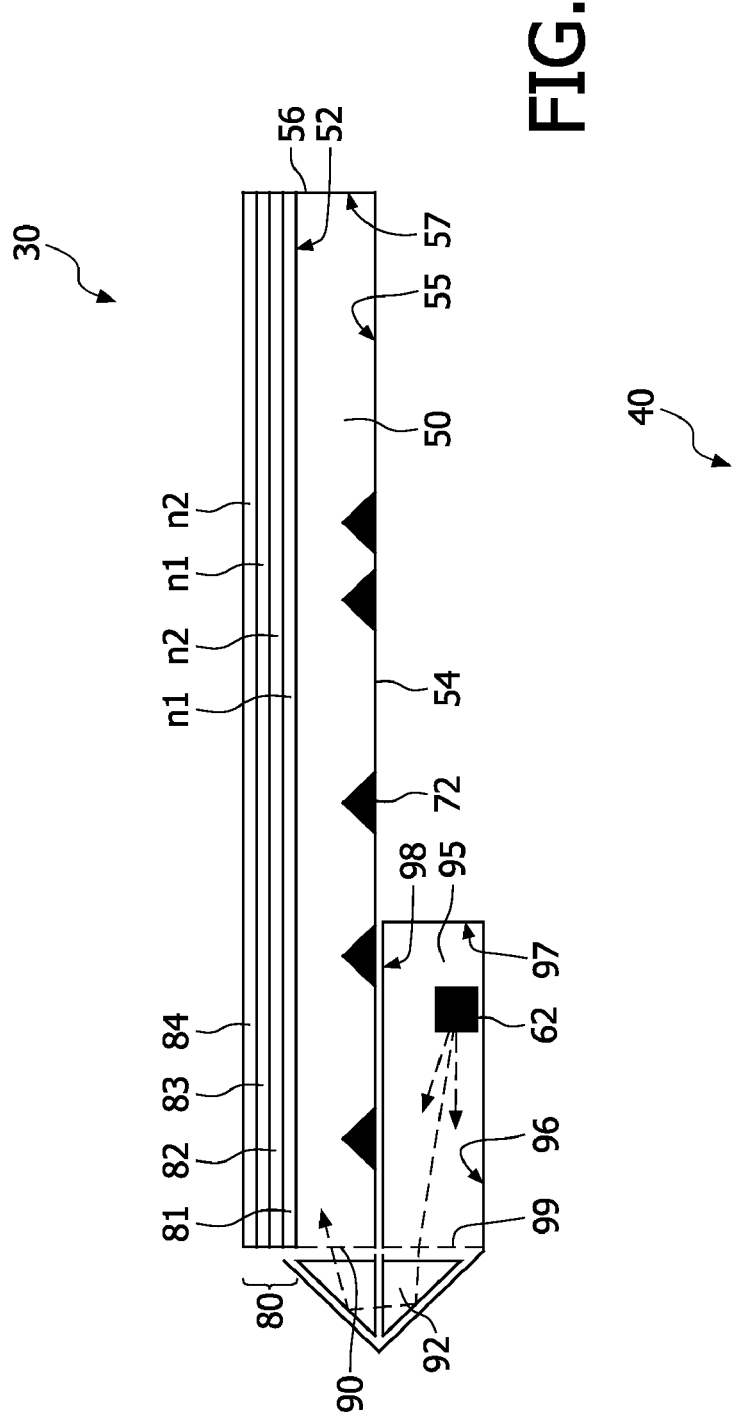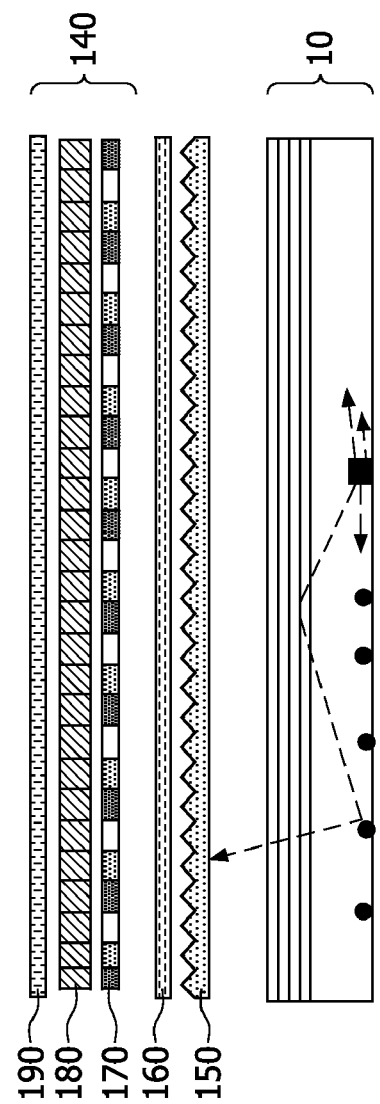

ILLUMINATION SYSTEM AND DISPLAY DEVICE

FIELD OF THE INVENTION

The invention relates to an illumination system for illuminating a display device.

The invention also relates to a display device.

BACKGROUND OF THE INVENTION

Illumination systems for illuminating a display device are known per se. They are used, inter alia, in non-emissive displays, such as liquid crystal display devices, also referred to as LCD panels, which are used in, for example, television receivers, (computer) monitors, (cordless) telephones and portable digital assistants. The illumination systems can also be used in, for example, projection systems such as a digital projector, or so-called beamers, for projecting images or displaying a television program, a film, a video program or a DVD, or the like. In addition, such illumination systems are used for general lighting purposes, such as for large-area direct-view light emitting panels such as applied, for instance, in signage, contour lighting, and billboards.

Such an illumination system is, for example, disclosed in US 2005/0001537. In the illumination system disclosed in the cited US application, the illumination system comprises an array of red, green and blue light emitting diodes in a mixing chamber. In an embodiment of the illumination system, the illumination system comprises two diffusers which are separated relatively far apart so as to form two mixing chambers. The first diffuser is shown in a generally central position in the illumination system. A second diffuser, essentially forming the top of the illumination system, defines the roof of the upper mixing chamber. The lower mixing chamber provides a relatively good mixture of the light, which is then made more uniform by the first diffuser. This fairly uniform light distribution is then further mixed in the second mixing chamber. This mixed light is then diffused again by the second diffuser to create a relatively uniform light profile.

A drawback of the known illumination system is that a light-mixing chamber for mixing the light over the light exit window is relatively thick.

SUMMARY OF THE INVENTION

It is an object of the invention to provide an illumination system having an improved light-mixing chamber.

According to a first aspect of the invention, the object is achieved with an illumination system comprising:

a light-mixing chamber comprising a light-exit window, a rear wall situated opposite the light-exit window, and edge walls extending between the light-exit window and the rear wall, a surface of the rear wall being substantially specularly reflective for specularly reflecting light impinging on the surface of the rear wall and having a relatively large angle of incidence with respect to an axis perpendicular to the rear wall, a light source for emitting light into the light-mixing chamber, the light being emitted into the light-mixing chamber in a direction substantially parallel to the light-exit window, a plurality of light out-coupling elements for coupling out the light from the light-mixing chamber, and an angularly reflective filter arranged at the light-exit window, the angularly reflective filter being constituted of a plurality of substantially transparent layers, each layer having a substantially uniform layer-thickness and having a refractive index, each set of two adjacent layers having different refractive indexes.

In the claims and description, "a relatively large angle of incidence with respect to an axis perpendicular to the rear wall" means an angle of incidence that is larger than 60 degrees and preferably larger than 80 degrees. The effect of the measures according to the invention is that light emitted by the light source is substantially confined inside the light-mixing chamber. The direction of the light emitted into the light mixing chamber is substantially parallel to the light-exit window. Due to this orientation of the direction of the light, a major part of the light emitted into the light mixing chamber impinges on the light-exit window at relatively large angles with respect to a normal-axis of the light-exit window. The light-exit window comprises the angularly reflective filter for confining the major part of the light emitted into the light mixing chamber. The angularly reflective filter is constituted of a plurality of transparent layers. Each transparent layer has a refractive index and each set of two adjacent layers has a different refractive index. This arrangement of transparent layers acts as a angularly selective reflective filter, reflecting light impinging on the light-exit window (and as such on the angularly reflective filter) having a relatively large angle of incidence with respect to the normal-axis, while transmitting light impinging on the light-exit window having a relatively small angle of incidence with respect to the normal-axis. The angle at which the angularly reflective filter changes from reflective to transmissive depends, for example, on the number of transparent layers constituting the angularly reflective filter, or, for example, on the differences between the refractive indexes of the adjacent transparent layers. The surface of the rear wall of the light-mixing chamber is substantially specularly reflective to light impinging on the surface at a relatively large angle of incidence with respect to the normal-axis of the rear wall. As a result, light emitted by the light source substantially preserves its angular distribution when reflected by the rear wall. The combination of the specularly reflective surface of the rear wall, the orientation of the direction of the light emitted into the light mixing chamber, and the presence of the angularly reflective filter at the light-exit window results in an efficient confinement, inside the light-mixing chamber, of the major part of the light emitted into the light mixing chamber. This confinement causes the light inside the light-mixing chamber to be more efficiently mixed, generating a substantially uniform distribution of the light inside the light-mixing chamber. Due to this efficient confinement, the thickness of the light-mixing chamber can be reduced compared to the known light-mixing chamber, while a substantially uniform distribution of the light inside the light-mixing chamber is achieved. The thickness of the light-mixing chamber is a dimension of the light-mixing chamber in a direction substantially perpendicular to the light-exit window. The illumination system further comprises a plurality of light out-coupling elements. When light which is confined inside the light-mixing chamber impinges on a light out-coupling element, the direction of propagation of the light is altered. Part of the light of which the direction of propagation is altered will impinge on the light-exit window at an angle such that the light is transmitted by the angularly reflective filter and subsequently emitted from the illumination system towards the display device. A further part of the light of which the direction of propagation is altered will impinge on the light-exit window at an angle such that the light is reflected by the angularly reflective filter and thus the further part of the light impinging on the light out-coupling elements is re-confined in the light-mixing chamber. The light outcoupling elements may, for example, be scattering elements, scattering light impinging on the light out-coupling elements, or, alternatively, the light out-coupling elements may, for example, be specularly reflecting elements, altering the direction of the light via specularly reflecting the light impinging on the light out-coupling elements.

A layer thickness of the substantially transparent layer of the angularly reflective filter is defined as a dimension of the substantially transparent layer in a direction substantially perpendicular to the light-exit window. Each layer of the plurality of substantially transparent layers must be substantially transparent to at least part of the light emitted by the light source when the light of the light source impinges on the substantially transparent layer in a direction substantially parallel to the normal of the substantially transparent layer.

A further benefit when using the angularly reflective filter arranged at the light-exit window is that the light emitted from the illumination system is partially collimated. Due to the angular dependency of the transmitted light, the light which is transmitted by the angularly reflective filter is light which impinges on the angularly reflective filter at an angle of incidence within a certain range of angles of incidence. Light impinging on the angularly reflective filter at angles different from the certain range of angles of incidence will be reflected by the angularly reflective filter and will remain confined inside the light-mixing chamber. Due to the angular dependency of the light which is transmitted by the angularly reflective filter, the transmitted light, and thus the light emitted from the illumination system, is collimated. The level of collimation depends, for example, on the number of transparent layers constituting the angularly reflective filter, or, for example, on the differences between the refractive indexes of adjacent transparent layers.

In known display devices, often a reflective polarizer is used for transmitting polarized light to the liquid crystal layer of the display device and for recycling the remainder of the light back into the illumination system. These known reflective polarizers are typically applied after the light of the illumination system has already been mixed and has already been uniformly distributed over the light-exit window of the illumination system. The reflective polarizers are constituted of a multilayer structure which is substantially different from the multilayer structure of the angularly reflective filter according to the invention. In the angularly reflective filter according to the present invention, each set of two adjacent transparent layers must have different refractive indexes. To confine the light efficiently, the difference in refractive index between two adjacent transparent layers must be valid for any polarization direction of the light emitted into the light-mixing chamber. The reflective polarizers are designed to substantially fully transmit light of a predefined polarization direction emitted by the illumination system, and to substantially fully reflect the remaining light emitted by the illumination system. For this reason the multilayer structure of the reflective polarizer is designed such that there is no variation of the refractive index of the light of the predefined polarization direction, while the variation of the refractive index for the remaining light is designed to fully reflect the light back into the illumination system, independent of an angle of incidence of the light impinging on the reflective polarizer. So the known reflective polarizers teach the skilled person that the multilayer structure must be optimized to substantially fully transmit light having the predefined polarization direction while substantially blocking all remaining light. Applying the known reflective polarizer as the angularly reflective filter would not solve the problem, because the reflective polarizer will fully transmit light having the predefined polarization direction, which will not result in confinement and mixing of the light of the predefined polarization direction inside the light-mixing chamber. Furthermore, due to the substantially free transmission of light having the predefined polarization direction by the known reflective polarizer, the use of the reflective polarizer as the angularly reflective filter will not result in a collimation of the light emitted from the illumination system.

In an embodiment of the illumination system, surfaces of the rear wall and of each edge wall are specularly reflective for specularly reflecting light within the light-mixing chamber. A benefit of this embodiment is that it results in a substantial preservation of the angular distribution of the reflected light within the light-mixing chamber and that the amount of mixing is increased.

Alternatively, surfaces of each edge wall are diffusively reflective for diffusively reflecting light within the light-mixing chamber. A benefit of this embodiment is that a more uniform light distribution can be obtained.

In an embodiment of the illumination system, the light emitted into the light-mixing chamber comprises light of a predefined color, and the sum of the thickness of two adjacent substantially transparent layers is substantially equal to half of the wavelength of the light of the predefined color. A benefit of this embodiment is that the angularly reflective filter in which the sum of the thickness of two adjacent layers is substantially equal to half of the wavelength of the light of the predefined color confines light of the predefined color, resulting in a uniform distribution of the light of the predefined color inside the light-mixing chamber. This embodiment is, for example, especially beneficial in a remote phosphor illumination system. The remote phosphor illumination system comprises a layer of luminescent material or of a mixture of luminescent materials converting the light of the predefined color into light having a further predefined color. Generally, the predefined color is a primary color blue. Part of the primary color blue will be converted by the luminescent material or by the mixture of luminescent materials into light of, for example, a primary color yellow, or, for example, a mixture of primary colors such as red and green. Another part of the light of the primary color blue will be transmitted through the remote phosphor layer and will mix with the light emitted by the remote phosphor layer, for example, resulting in light being perceived as white. Because the sum of the thickness of two adjacent substantially transparent layers is substantially equal to half the wavelength of the light of the predefined color, the light of the predefined color is confined and mixed inside the light-mixing chamber. Alternatively, the predefined color of the light emitted into the light-mixing chamber, for example, is ultraviolet which, for example, is fully converted into visible light by the remote phosphor layer. The remote phosphor layer may be applied outside the light-mixing chamber, for example, between the illumination system and the display device. Alternatively, the remote phosphor layer may be applied inside the light-mixing chamber, for example, as light out-coupling elements.

In an embodiment of the illumination system, at least one of the transparent layers is a birefringent uniaxial layer having a birefringent symmetry axis arranged substantially parallel to the light-exit window. A benefit of this embodiment is that due to the birefringent uniaxial layer the variation of the index of refraction for light having a polarization direction perpendicular to the birefringent symmetry axis will be less compared to the index of refraction for the remainder of the light confined in the light-mixing chamber. Due to this difference, the light having the polarization direction perpendicular to the birefringent symmetry axis is confined less compared to the remainder of the light confined in the light-mixing chamber, resulting in partially polarized light emitted by the light-mixing chamber of the illumination system.

In an embodiment of the illumination system, the light emitted into the light-mixing chamber is substantially polarized light having a polarization direction substantially parallel to the light-exit window. A benefit of this embodiment is that for light having the polarization direction substantially parallel to the light-exit window the efficiency of the confinement of the light in the light-mixing chamber is improved. The inventors have realized that the coefficient of reflection for Fresnel reflections at an interface between two substantially transparent media having different indexes of refraction is different for different polarization directions of the light. Light having a polarization direction parallel to the interface generally has a higher coefficient of reflection compared to the remainder of the light. By choosing the polarization direction of the light emitted into the light-mixing chamber to be substantially parallel to the light-exit window, the confinement of the light is improved due to the higher coefficient of reflection of the polarized light compared to the unpolarized light. This improved confinement of the light may, for example, result in a further reduction of the dimensions of the light mixing chamber.

In an embodiment of the illumination system, the light-mixing chamber is an optical light guide. A benefit of this embodiment is that part of the light confined in the light-mixing chamber may be confined via total internal reflection, which reduces reflection losses inside the light-mixing chamber.

In an embodiment of the illumination system, the optical light guide is wedge-shaped. A benefit of this embodiment is that the wedge shape generates a gradual outcoupling of the light emitted into the light-mixing chamber, thus further improving the uniformity of the light emitted from the illumination system.

In an embodiment of the illumination system, the light source comprises a plurality of side-emitting light emitting diodes distributed on the rear wall of the light-mixing chamber. A benefit of this embodiment is that the side-emitting light emitting diodes (further also referred to as LEDs) arranged on the rear wall of the light-mixing chamber already emit light in a direction substantially parallel to the rear wall and thus substantially parallel to the light-exit window.

In an embodiment of the illumination system, at least one of the edge walls of the light-mixing chamber comprises a light-input window, and the light source is arranged in an edge-lit configuration emitting light into the light-mixing chamber via the light-input window. A benefit of this embodiment is that the edge-lit configuration generally further reduces the thickness of the illumination system. Furthermore, the edge-lit configuration enables the use of, for example, low-pressure gas discharge lamps as light source, while the direction of the light emitted into the light-mixing chamber is still substantially parallel to the light-exit window. The use of low-pressure gas discharge lamps in addition improves the color uniformity of the light emitted by the light source into the light-mixing chamber and generally improves the efficacy of the illumination system.

In an embodiment of the illumination system, at least one of the edge walls of the light-mixing chamber comprises a light-input window, and the illumination system comprises a further light-mixing chamber, the further light-mixing chamber emitting light into the light-mixing chamber via the light-input window. A benefit of this embodiment is that the light source can be constituted of a plurality of light emitting diodes, for example, emitting a plurality of primary colors.

The further light-mixing chamber will mix the light of the plurality of primary colors so as to obtain, for example, substantially white light which is emitted into the light-mixing chamber. Due to the confinement of the light in the light-mixing chamber, the light is uniformly distributed inside the light-mixing chamber.

In an embodiment of the illumination system, an angular distribution of the light emitted into the light-mixing chamber with respect to a plane substantially perpendicular to the light-exit window is less than approximately 30 degrees, and preferably less than approximately 10 degrees. A benefit of this embodiment is that substantially all light emitted into the light-mixing chamber is confined inside the light-mixing chamber. Furthermore, by emitting light into the light-mixing chamber which has a relatively high degree of collimation, it suffices if the angularly reflective filter comprises fewer substantially transparent layers to obtain a certain level of confinement, compared to emitting light into the light-mixing chamber which has a relatively low degree of collimation. Although the layers of the angularly reflective filter are described as substantially transparent, there will be some residual absorption of the light which is reflected or transmitted. When fewer substantially transparent layers are required to obtain a required level of confinement of the light inside the light-mixing chamber, the efficiency of the illumination system is improved.

In an embodiment of the illumination system, the plurality of light out-coupling elements are substantially uniformly distributed on the rear wall. A benefit of this embodiment is that the uniform distribution of the plurality of light out-coupling elements results in a uniform distribution of the light emitted from the light-exit window of the illumination system according to the invention.

In an embodiment of the illumination system, the density of the plurality of light out-coupling elements in the light-mixing chamber varies. The density of the plurality of light out-coupling elements, for example, varies across the rear wall of the light-mixing chamber to obtain a predefined uniformity of the emitted light. Alternatively, for example, a density variation may be applied to correct for any remaining non-uniformities of the light emitted from the illumination system.

In an embodiment of the illumination system, the plurality of light out-coupling elements are specularly reflecting elements. A benefit of this embodiment is that the light impinging on the light out-coupling elements is not diffusely scattered but specularly reflected, substantially preserving the angular distribution of the light emitted by the light source. Furthermore, the specularly reflective elements generally preserve a polarization direction of the reflected light. When using a light source emitting polarized light into the light-mixing chamber, the light coupled out by the light out-coupling element is also polarized, enabling the illumination system to efficiently emit substantially polarized light towards the display device.

In an embodiment of the illumination system, the plurality of light out-coupling elements are arranged in the angularly reflective filter. A benefit of this embodiment is that when applying the angularly reflective filter, the plurality of light out-coupling elements may be applied simultaneously, for example, as part of the first substantially transparent layer of the angularly reflective filter. Applying the light out-coupling elements in the angularly reflective filter enables a simple and flexible change of the distribution of the plurality of light out-coupling elements by changing the distribution of the plurality of light out-coupling elements in the angularly reflective filter.

The invention also relates to a display device comprising the illumination system according to the invention.

BRIEF DESCRIPTION OF THE DRAWINGS

These and other aspects of the invention are apparent from and will be elucidated with reference to the embodiments described hereinafter.

In the drawings:

FIGS. 1A 1B and 1C show a schematic cross-sectional view of an illumination system according to the invention, FIG. 4A shows a schematic cross-sectional view of an illumination system comprising a further light-mixing chamber, and FIG. 4B shows a schematic cross-sectional view of a display device according to the invention.

The Figures are purely diagrammatic and not drawn to scale. Particularly for clarity, some dimensions are exaggerated strongly. Similar components in the Figures are denoted by the same reference numerals as much as possible.

DETAILED DESCRIPTION OF EMBODIMENTS

Figure 1C:
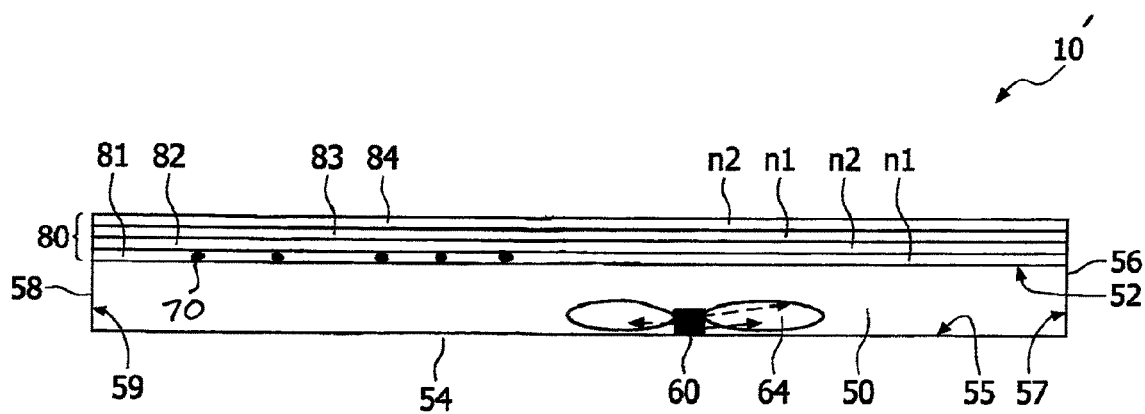

FIGS. 1A, 1B and 4A show a schematic cross-sectional view of an illumination system 10, 20, 30 according to the invention. The illumination system 10, 20, 30 according to the invention comprises a light-mixing chamber 50 comprising a light-exit window 52, a rear wall 54 and edge walls extending between the light exit window and the rear wall 54. The illumination system 10, 20, 30 further comprises a light source 60, 62 emitting light into the light-mixing chamber 50. The light is emitted into the light-mixing layer in a direction substantially parallel to the light-exit window 52. The illumination system 10, 20, 30 comprises a plurality of light out-coupling elements 70, 72 for coupling out light from the illumination system 10, 20, 30 and comprises an angularly reflective filter 80 arranged at the light-exit window 52. The angularly reflective filter 80 is constituted of a plurality of substantially transparent layers 81, 82, 83, 84, each one of the transparent layer 81, 82, 83, 84 having a substantially uniform layer thickness. Each set of two consecutive transparent layers 81, 82; 82, 83; 83, 84 of the plurality of transparent layers 81, 82, 83, 84 has different refractive indexes n1, n2. The angularly reflective filter 80 may, for example, be constituted of layers 81, 83 comprising polymethylmeta-acrylate (also known as PMMA, index of refraction being approximately 1.50) alternated with layers 82, 84 comprising air (index of refraction being approximately 1.0), or of layers 81, 83 comprising polycarbonate (also known as PC, index of refraction being approximately 1.58) alternated with layers 82, 84 comprising air. Alternatively, the angularly reflective filter 80 may be constituted of layers 81, 82, 83, 84 of solid material having different refractive indexes n1, n2 and being applied directly on top of each other, thus excluding air from between the layers 81, 82, 83, 84. The angularly reflective filter 80 may, for example, be constituted of substantially transparent layers 81, 82, 83, 84, each having different refractive indexes n1, n2, n3, n4, or may, for example, be constituted of two different materials having different refractive indexes n1, n2, the layers 81, 82, 83, 84 of different materials being alternatingly applied to form the angularly reflective filter 80. Also other combinations of substantially transparent layers 81, 82, 83, 84 may be applied to form the angularly reflective filter 80 without departing from the scope of the invention.

The arrangement of the substantially transparent layers 81, 82, 83, 84 acts as an angularly selective reflective filter 80, reflecting light impinging on the angularly reflective filter 80 having a relatively large angle of incidence i with respect to the normal-axis N, while transmitting light impinging on the angularly reflective filter 80 having a relatively small angle of incidence i with respect to the normal-axis N. Due to the direction of the light emitted into the light-mixing chamber 50, a major part of this light impinges on the angularly reflective filter 80 at relatively large angles i with respect to a normal-axis N, confining the major part of the light emitted into the light-mixing chamber 50. Inner surfaces 55, 57, 59 of the light-mixing chamber 50 are specularly reflective surfaces 55, 57, 59 substantially preserving the angular distribution 64 of the reflected light from these surfaces 55, 57, 59. In an alternative embodiment, the inner surface 55 is a substantially specularly reflective surface for specularly reflecting light impinging on the inner surface 55 and having a relatively large angle of incidence with respect to an axis perpendicular to the inner surface 55. For example, the inner surface 55 in this alternative embodiment consists of a white diffuser that is covered by a transparent layer or by several transparent layers with alternating indices of refraction. In another alternative embodiment, the inner surfaces 57, 59 are diffusively reflective surfaces for diffusively reflecting light within the mixing-chamber 50. The combination of the specularly reflective inner surfaces 55, 57, 59, the orientation of the direction of the light emitted into the light-mixing chamber 50, and the presence of the angularly reflective filter 80 at the light-exit window 52 results in an efficient confinement of the major part of the light emitted into the light-mixing chamber 50 inside the light-mixing chamber 50. This confinement causes the light inside the light-mixing chamber 50 to be mixed, generating a substantially uniform distribution of the light inside the light-mixing chamber 50. The illumination system 10, 20 further comprises a plurality of light out-coupling elements 70, 72. When light which is confined inside the light-mixing chamber 50 impinges on a light out-coupling element, the light is coupled out of the light-mixing chamber 50, for example, via scattering, or, for example, via specular reflection from the light out-coupling elements 70, 72. Part of the light which is scattered or reflected from the light out-coupling elements 70, 72 will impinge on the light-exit window 52 at an angle such that the light is transmitted by the angularly reflective filter 80 and subsequently emitted from the illumination system 10, 20 towards the display device 40 (see FIG. 4B). A further part of the light which is scattered or reflected from the light out-coupling elements 70, 72 will impinge on the light-exit window 52 at an angle such that the light is reflected by the angularly reflective filter 80 and thus the further part of the scattered light is re-confined in the light-mixing chamber 50.

The level of confinement may, for example, be increased by increasing the number of substantially transparent layers 81, 82, 83, 84 arranged at the light-exit window 52, which, in most cases, leads to a better performance of the angularly reflective filter 80. However, at the same time, the increased number of substantially transparent layers 81, 82, 83, 84 will reduce the efficiency of the illumination system 10, 20, 30 due to residual absorption of light when light is being reflected or transmitted by the increased number of substantially transparent layers 81, 82, 83, 84. A designer of such an illumination system 10, 20, 30 may use this dependency to optimize the illumination system 10, 20, 30. For example, an optimal number of substantially transparent layers 81, 82, 83, 84 is determined by the degree of collimation of the light which is emitted into the light-mixing chamber 50. If the light emitted into the light-mixing chamber 50 is not collimated relatively strongly, then a relatively large number of substantially transparent layers 81, 82, 83, 84 is required (typically 10 and higher). If the light emitted into the light-mixing chamber 50 is collimated relatively strongly, then the number of substantially transparent layers 81, 82, 83, 84 may be below 10. Moreover, if the light emitted into the light-mixing chamber 50 is very strongly collimated, for example, when using a laser as a light source 62 (for example, having an angular distribution of less than approximately 5 degrees), possibly only a single substantially transparent layer 81, 82, 83, 84 may be required to achieve a required confinement of the light inside the light-mixing chamber 50.

An additional effect of the angularly reflective filter 80 arranged at the light-exit window 52 is that the light emitted from the illumination system 10, 20, 30 is partially collimated. Due to the angular dependency of the transmitted light, the light which is transmitted by the angularly reflective filter 80 is light which impinges on the angularly reflective filter 80 at an angle of incidence i within a certain range of angles of incidence i. Light impinging on the angularly reflective filter 80 at angles different from the certain range of angles of incidence i will be reflected by the angularly reflective filter 80 and will remain confined inside the light-mixing chamber 50. The level of collimation depends, for example, on the number of transparent layers 81, 82, 83, 84 constituting the angularly reflective filter 80, or, for example, on the differences between the refractive indexes of the adjacent transparent layers 81, 82, 83, 84.

The light out-coupling elements 70, 72, for example, may be irregularities such as scratches on the rear wall 54, or, for example, glass pellets attached to the rear wall 54. In an embodiment of the illumination system 10, 20, 30 according to the invention, the light out-coupling elements 72, for example, are specularly reflective structures 72, for example, specularly reflective irregularities 72 at the rear wall 54. A benefit when using specularly reflective structures 72 as light out-coupling elements 70, 72 is that these structures substantially preserve the angular distribution 64 of the light emitted into the light-mixing chamber 50 and thus limit the angular distribution 64 of the light emitted by the illumination system 10, 10' 20, 30. Furthermore, specularly reflective structures 72 substantially preserve a polarization direction of the light which is reflected from the specularly reflective structures 72. When the light emitted into the light-mixing chamber 50 is constituted of partially polarized light, the use of specularly reflective structures 72 enables the illumination system 10, 20, 30 according to the invention to emit substantially polarized light towards the display device 40. Alternatively, the out-coupling elements 70, 72 may be, for example, scattering elements 70 embedded, for example, in the angularly reflective filter 80, as shown in FIG. 1C, such as in a first substantially transparent layer 81 of the angularly reflective filter 80 arranged at the light-exit window 52 of the light-mixing chamber 50. When applying the light out-coupling elements 70 embedded in the angularly reflective filter 80, a distribution of the light out-coupling elements 70 can be altered relatively easily, for example, by changing a concentration of the light out-coupling elements 70 in the angularly reflective filter 80. In an embodiment in which the light-mixing chamber 50 is constituted of an optical light guide, the light out-coupling elements may, for example, be light scattering elements 70 embedded in the optical light guide.

The light source 60, 62 may, for example, be a LED 60, 62 or a plurality of LEDs 60, 62 arranged, for example, in a one- or two-dimensional array. To achieve that the light is emitted into the light-mixing chamber 50 in a direction substantially parallel to the light-exit window 52, side-emitting LEDs 60 may be arranged on the rear wall 54 of the light-mixing chamber 50 and, for example, uniformly distributed on the rear wall 54 of the light-mixing chamber 50. Alternatively, the LEDs 60, 62 may be arranged, for example, in an array of LEDs 60, 62 emitting light from an edge of the light-mixing chamber 50 into the light-mixing chamber 50, for example, via a light-input window 90 arranged at an edge wall 56, 58 of the light-mixing chamber 50. The light source 60, 62 may, for example, also be a laser light source (not shown) or a plurality of laser light sources. Alternatively, the light source may, for example, be a low-pressure gas discharge lamp (not shown) or a plurality of low-pressure gas discharge lamps, preferably arranged at an edge of the light-mixing chamber 50. The low-pressure gas discharge lamp, for example, may comprise a mirror (not shown) arranged at a side of the low-pressure gas discharge lamp facing away from the light-mixing chamber 50 for redirecting part of the light of the low-pressure gas discharge lamp which is emitted away from the light-mixing chamber 50 back towards the light-mixing chamber 50.

In the embodiment of the illumination system 10 as shown in FIG. 1A, the light source 60, for example, is a side-emitting LED 60 arranged at the rear wall 54 of the illumination system 10. The side-emitting LED 60 arranged at the rear wall 54 typically emits light in a direction substantially parallel to the rear wall 54. The distribution of the light emitted by the side-emitting LED 60 may, for example, be substantially symmetrical in all directions originating from the light source in the plane parallel to the rear wall 54 and having a limited angular distribution 64 of the light emitted by the side-emitting LED 60 in a plane perpendicular to the light-exit window 52. In the embodiment shown in FIG. 1A, the rear wall 54 is arranged substantially parallel to the light-exit window 52, and thus the direction of the light emitted by the side-emitting LEDs 60 is also parallel to the light-exit window 52. A major part of the light emitted by the side-emitting LED 60 is confined inside the light-mixing chamber 50. Due to the substantially specularly reflective surfaces 55, 57, 59, the angular distribution 64 of the light emitted by the side-emitting LED 60 is substantially preserved, while the light is being confined inside the light-mixing chamber 50. When light impinges on a light out-coupling element 70, 72, the light out-coupling element 70, 72 will redirect the light, such that at least part of the redirected light will be transmitted by the angularly reflective filter 80 and emitted from the illumination system 10 towards the display device 40.

In the embodiment of the illumination system 20 as shown in FIG. 1B, the light source 62, for example, is an array of LEDs 62 arranged at the light-input window 90 of the light-mixing chamber 50 of the illumination system 20, emitting light into the light-mixing chamber 50 via the light-input window 90. Alternatively, the light source in the illumination system 20 as shown in FIG. 1B may, for example, be a low-pressure gas discharge lamp.

Figure 2A:
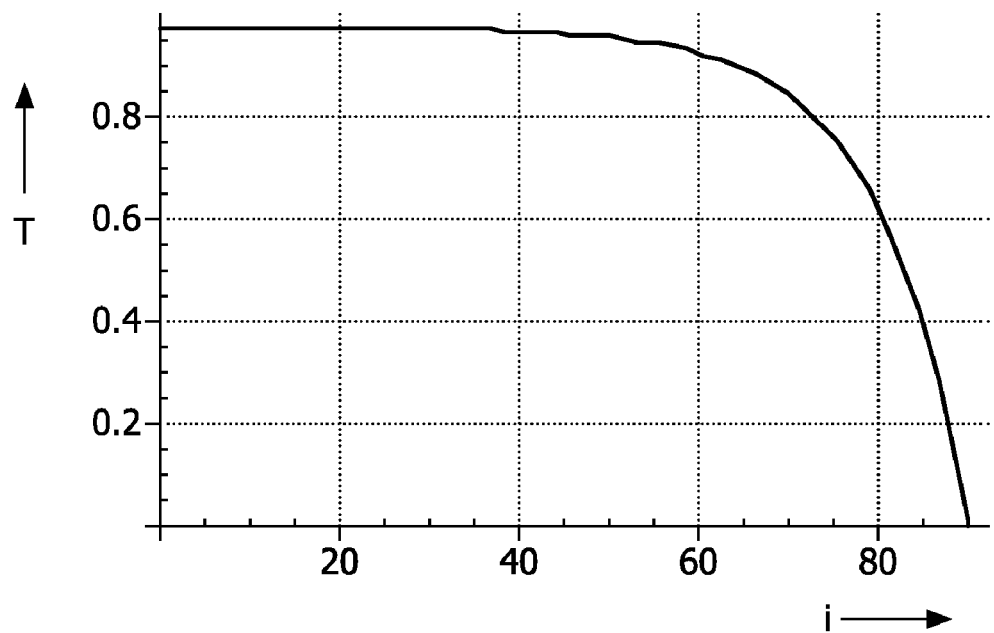
FIGS. 2A and 2B show an angular dependency of the transmission through and reflection from an interface between two consecutive substantially transparent layers.
Figure 2B:
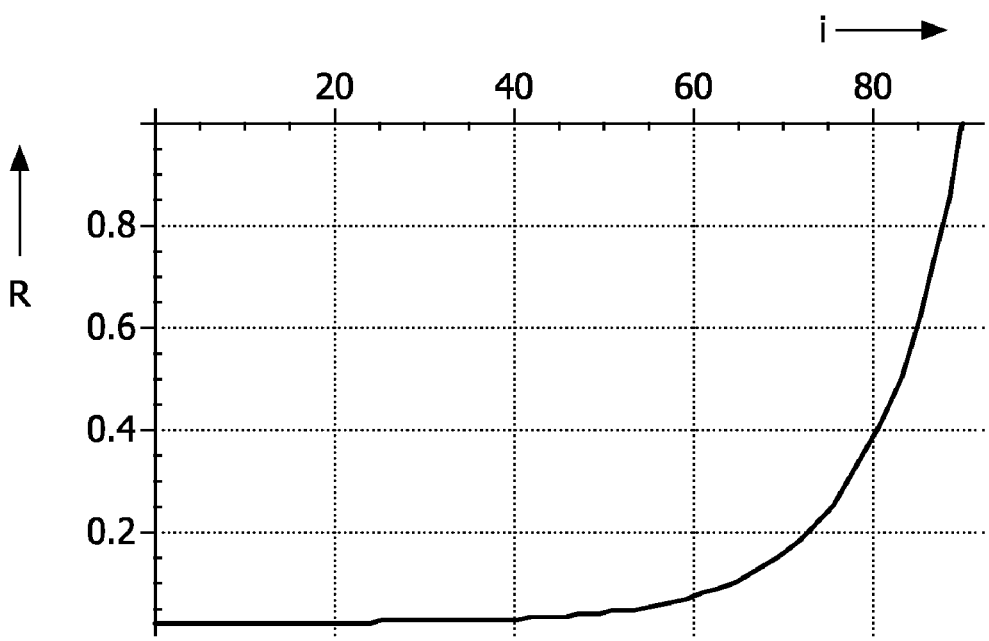

FIGS. 2A and 2B show an angular dependency of the transmission and reflection from an interface between two consecutive substantially transparent layers 81, 82; 82, 83; 83, 84, one layer 81, 83 having an index of refraction equal to 1.0 and the other layer 82, 84 having an index of refraction equal to 1.5. The horizontal axis of the graphs shown in FIGS. 2A and 2B represents an angle of incidence i of the light impinging on the interface between the two consecutive substantially transparent layers 81, 82; 82, 83; 83, 84. The angle of incidence i is defined with respect to the normal-axis N of the interface between the two consecutive substantially transparent layers 81, 82; 82, 83; 83, 84. The vertical axis of the graphs shown in FIGS. 2A and 2B indicates a normalized level of transmission T and a normalized level of reflection R, respectively. As can be seen from the graphs of FIGS. 2A and 2B, part of the light having a relatively large angle of incidence i, for example, an angle of incidence i larger than 60 degrees with respect to the normal-axis N to the interface will be reflected. The angularly reflective filter 80 comprises a plurality of interfaces within the plurality of substantially transparent layers 81, 82, 83, 84 having different refractive indexes n1, n2. At each of these interfaces a reflection/transmission of light comparable to the reflection/transmission characteristic shown in FIGS. 2A and 2B will occur. A stack of layers 81, 82, 83, 84 comprising a plurality of interfaces having the characteristic reflection/transmission as shown in FIGS. 2A and 2B result in an angularly reflective filter 80 which reflects a major part of the light impinging on the angularly reflective filter 80 at an angle equal or larger than a certain predefined angle of incidence i with respect to the normal-axis N of the plurality of interfaces and which transmits a major part of the light impinging on the angularly reflective filter 80 at an angle smaller than the certain predefined angle of incidence i with respect to the normal-axis N of the plurality of interfaces.

Figure 3A:
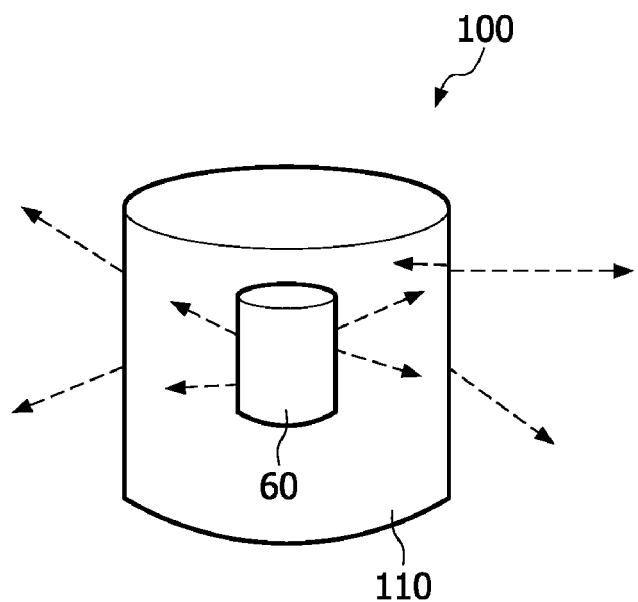
FIG. 3A shows a schematic plan view of an embodiment of a polarized light source.

FIG. 3A shows a schematic plan view of an embodiment of a polarized light source 100. The polarized light source 100 as shown in FIG. 3A comprises a side-emitting LED 60 being enwrapped in a polarization reflective foil 110, for example, a foil commercially known as BEF 110 or DBEF foil 110. Alternatively, a laser light source (not shown) may be used as the polarized light source 100.

Figure 3B:
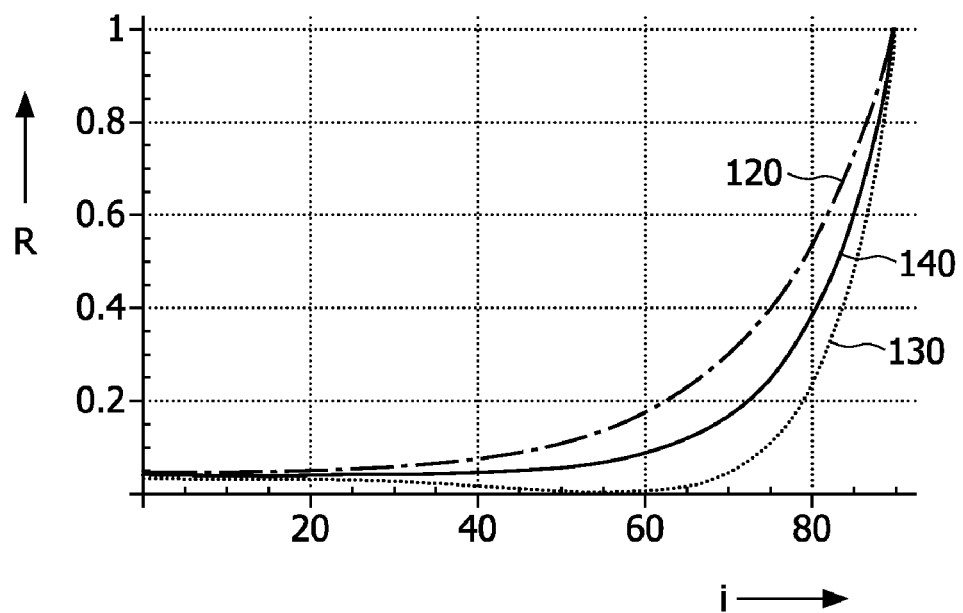
FIG. 3B shows an angular dependency of the reflection from an interface between two consecutive substantially transparent layers for light having different polarization directions.

FIG. 3B shows an angular dependency of the reflection from an interface between two consecutive substantially transparent layers 81, 82; 82, 83; 83, 84 for light having different polarization directions. The horizontal axis of the graph shown in FIG. 3B represents an angle of incidence i of the light impinging on the interface between the two consecutive substantially transparent layers 81, 82; 82, 83; 83, 84. In the graph shown in FIG. 3B, the index of refraction at one side of the interface is equal to 1.0 and the refractive index at the other side of the interface is equal to 1.5. A comparable effect occurs at other refractive indexes. The angle of incidence i is defined with respect to a normal-axis N of the interface between the two consecutive substantially transparent layers 81, 82; 82, 83; 83, 84. The vertical axis of the graph shown in FIG. 3B indicates a normalized level of reflection R. A first curve 120, indicated in FIG. 3B with a dash-dot line 120, shows a variation of the reflection of light having a polarization direction parallel to the interface between the two consecutive layers 81, 82; 82, 83; 83, 84. A second curve 130, indicated in FIG. 3B with a dotted line 130, shows a variation of the reflection of light having a polarization direction parallel to a plane perpendicular to the interface between the two consecutive substantially transparent layers 81, 82; 82, 83; 83, 84. A third curve 140, indicated in FIG. 3B with a solid line 140, shows an average of the variation of substantially unpolarized light at the interface between the two transparent layers 81, 82; 82, 83; 83, 84. As can be seen from FIG. 3B, light having the polarization direction parallel to the interface between the two consecutive layers 81, 82; 82, 83; 83, 84 has a higher reflection R compared to light having the polarization direction parallel to the plane perpendicular to the interface. Thus, applying a light source emitting light having the polarization direction parallel to the interface into the light-mixing chamber 50 will cause the light to be more efficiently confined in a light-mixing chamber 50, resulting in a possible further reduction of the thickness of the light-mixing chamber 50. This effect of more efficient confinement in a light-mixing chamber 50 for the polarized light source 100 having the polarization direction substantially parallel to the light-exit window 52 is not limited to the application of the light-mixing chamber 50 with the angularly reflective filter 80, but also holds for illumination systems not having the angularly reflective filter 80. For example, when using a light guide, the light from the polarized light source 100, of which the polarization direction is parallel to, for example, a light-exit window of the light guide, is relatively efficiently confined inside the light guide due to the use of the polarized light source. Also when using a wedge-shaped light guide, the light from the polarized light source 100 will be more efficiently confined, compared to un-polarized light, inside the wedge-shaped light guide, even without the application of the angularly reflective filter 80. In the embodiments of the light-mixing chambers as, for example, disclosed in FIGS. 1A, 1B, 4A and 4B, when replacing the angularly reflective filter 80, for example, by a transparent cover plate (not shown) as light-exit window 52, the confinement of the light emitted into the light-mixing chamber 50 having the polarization direction substantially parallel to the light-exit window 52 results in a confinement of the polarized light inside the light-mixing chamber 50, while the need for the angularly reflective filter 80 for confinement is removed. Using the polarized light source 100 having the polarization direction substantially parallel to the light-exit window 52 results in an improvement of the uniformity, compared to the use of an un-polarized light without the use of the angularly reflective filter 80.

FIG. 4A shows a schematic cross-sectional view of an illumination system 30 comprising a further light-mixing chamber 95. In the embodiment of the illumination system shown in FIG. 4A, the further light-mixing chamber 95 is arranged parallel to the light-mixing chamber 50. Light is emitted in the further light-mixing chamber 95, for example, by a plurality of light sources 62 emitting light of different colors. The light of different colors is, for example, mixed in the further light-mixing chamber 95, which preferably comprises specularly reflecting surfaces 96, 97, 98 for confining the light within the further light-mixing chamber 95. The further light-mixing chamber 95 comprises a further light-output window 99, for example, arranged at an edge wall of the further light-mixing chamber 95 as shown in FIG. 4A. This further light-output window 99 is coupled to the light-input window 90 of the light-mixing chamber 50, which emits the light mixed in the further light-mixing chamber 95 into the light-mixing chamber 50. The further light-output window 99 is, for example, coupled to the light-input window 90 of the light-mixing chamber 50 via a prism 92 or via a plurality of prisms 92 (as shown in FIG. 4A). A benefit of using prisms 92 is that the light is redirected using total internal reflection, resulting in a substantially loss-free redirection of the light. Alternatively, a mirror (not shown) may be used for redirecting the light emitted from the further light-output window 99 towards the light-input window 90 of the light-mixing chamber 50. The light source 60, 62 may again be a side-emitting LED 60 as shown in FIG. 4A. Alternatively, a laser light source (not shown) or a low-pressure gas discharge lamp (not shown) may be used as light source 60, 62.

FIG. 4B shows a schematic cross-sectional view of a display device 40 according to the invention. The display device 40 comprises the illumination system 10 as shown in FIG. 1A.

Light emitted by the illumination system 10 is substantially uniformly distributed over the light-exit window 52 and is partially collimated. The display device 40 as shown in FIG. 4B may, for example, comprise a brightness enhancement film 150, also indicated as BEF 150. The BEF 150 collimates light, using a structured surface and will substantially only transmit light impinging on the BEF 150 at an angle of incidence i which is within a predefined range and reflect the remainder of the light back into the illumination system 10 for recycling. The BEF 150 may be applied to further collimate the light which is emitted by the illumination system 10 towards an image creation layer 140 of the display device 40. In addition, the display device 40, for example, comprises a dual brightness enhancement film 160, also indicated as DBEF 160, which substantially only transmits light having a predefined polarization direction, and which reflects the remainder of the light back into the illumination system 10 for recycling. The DBEF 160 is, for example, used as a polarizer for the image creation layer 140. The image creation layer 140, for example, comprises a set of color filters 170, an array of liquid crystal cells 180 and an analyzer 190 for creating an image on the display device 40. Alternatively, a diffuser may be used between the angularly reflective filter of the illumination system 10 and the BEF 150.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination system for illuminating a display device, the illumination system comprising:
   a light-mixing chamber comprising a light-exit window, a rear wall situated opposite the light-exit window, and edge walls extending between the light-exit window and the rear wall, a surface of the rear wall being substantially specularly reflective for specularly reflecting at least a portion of light impinging on the surface of the rear wall,
   a light source for emitting light into the light-mixing chamber, the light being emitted into the light-mixing chamber in a direction substantially parallel to the light-exit window,
   a plurality of light out-coupling elements for coupling out the light from the light-mixing chamber, and
   an angularly reflective filter arranged at the light-exit window, the angularly reflective filter being constituted of a plurality of substantially transparent layers, each layer having a substantially uniform layer-thickness and having a refractive index, each set of two adjacent layers having different refractive indexes,
   wherein at least one of the transparent layers is a birefringent uniaxial layer having a birefringent symmetry axis arranged substantially parallel to the light-exit window.

2. The illumination system as claimed in claim 1, wherein surfaces of the rear wall and of each edge wall are specularly reflective for specularly reflecting light within the light-mixing chamber.

3. The illumination system as claimed in claim 1, wherein surfaces of each edge wall are diffusively reflective for diffusively reflecting light within the light-mixing chamber.

4. The illumination system as claimed in claim 1, wherein the light emitted into the light-mixing chamber comprises light of a predefined color, and the sum of the thickness of two adjacent substantially transparent layers is substantially equal to half of the wavelength of the light of the predefined color.

5. The illumination system as claimed in claim 1, wherein the light emitted into the light-mixing chamber is substantially polarized light having a polarization direction substantially parallel to the light-exit window.

6. The illumination system as claimed in claim 1, wherein the light-mixing chamber is an optical light guide.

7. The illumination system as claimed in claim 6, wherein the optical light guide is wedge-shaped.

8. The illumination system as claimed in claim 1, wherein the light source comprises a plurality of side-emitting light emitting diodes distributed on the rear wall of the light-mixing chamber.

9. The illumination system as claimed in claim 1, wherein at least one of the edge walls of the light-mixing chamber comprises a light-input window, and the light source is arranged in an edge-lit configuration emitting light into the light-mixing chamber via the light-input window.

10. The illumination system as claimed in claim 1, wherein at least one of the edge walls of the light-mixing chamber comprises a light-input window, and the illumination system comprises a further light-mixing chamber, the further light-mixing chamber emitting light into the light-mixing chamber via the light-input window.

11. The illumination system as claimed in claim 1, wherein an angular distribution of the light emitted into the light-mixing chamber with respect to a plane substantially perpendicular to the light-exit window is less than approximately 30 degrees.

12. The illumination system as claimed in claim 1, wherein the plurality of light out-coupling elements are substantially uniformly distributed on the rear wall.

13. The illumination system as claimed in claim 1, wherein the density of the plurality of light out-coupling elements in the light-mixing chamber varies.

14. The illumination system as claimed in claim 1, wherein the plurality of light out-coupling elements are specularly reflecting elements.

15. A display device comprising the illumination system as claimed in claim 1.

16. The illumination system as claimed in claim 1, wherein an angular distribution of the light emitted into the light-mixing chamber with respect to a plane substantially perpendicular to the light-exit window is less than approximately 10 degrees.

17. An illumination system for illuminating a display device, the illumination system comprising:
   a light-mixing chamber comprising a light-exit window, a rear wall situated opposite the light-exit window, and edge walls extending between the light-exit window and the rear wall, a surface of the rear wall being substantially specularly reflective for specularly reflecting at least a portion of light impinging on the surface of the rear wall, a light source for emitting light into the light-mixing chamber, the light being emitted into the light-mixing chamber in a direction substantially parallel to the light-exit window, a plurality of light out-coupling elements for coupling out the light from the light-mixing chamber, and an angularly reflective filter arranged at the light-exit window, the angularly reflective filter being constituted of a plurality of substantially transparent layers, each layer having a substantially uniform layer-thickness and having a refractive index, each set of two adjacent layers having different refractive indexes, wherein the plurality of light out-coupling elements are arranged in the angularly reflective filter.

* * * * *